United States Patent [19]
King

[11] 3,975,769
[45] Aug. 17, 1976

[54] STORAGE DEVICE UTILIZING FLEXIBLE MAGNETIC DISKS

[75] Inventor: Francis Kong King, Rochester, Minn.

[73] Assignee: International Business Machines Corporation, Armonk, N.Y.

[22] Filed: Feb. 7, 1975

[21] Appl. No.: 548,125

[52] U.S. Cl. .................................. 360/99; 360/86; 360/98; 360/105
[51] Int. Cl.² .................... G11B 5/82; G11B 17/22; G11B 25/04
[58] Field of Search .................. 360/99, 97, 98, 86, 360/102–103, 105, 129–130, 122; 346/137

[56] References Cited
UNITED STATES PATENTS

| | | | |
|---|---|---|---|
| 3,810,243 | 5/1974 | McGinnis | 360/102 |
| 3,867,723 | 2/1975 | Penfold et al. | 360/98 |

OTHER PUBLICATIONS
IBM Technical Disclosure Bulletin, Orlando, vol. 17, No. 8, Jan. 1975, p. 2369.

*Primary Examiner*—Alfred H. Eddleman
*Attorney, Agent, or Firm*—Keith T. Bleuer

[57] ABSTRACT

A magnetic storage device having a stack of spaced flexible magnetic disks and an access arm carrying a magnetic transducer moveable between adjacent disks in the stack for accessing the disk surfaces. The access arm is blunt on one side edge and is sharp on the other side edge and increases gradually in thickness from the sharp edge to a position of maximum arm thickness adjacent the blunt edge at which the magnetic transducer is embedded in the arm. The disks rotate so as to move across the arm from the sharp edge toward the blunt edge, and the disks thus closely follow the surfaces of the access arm and particularly the surface of the transducer.

5 Claims, 13 Drawing Figures

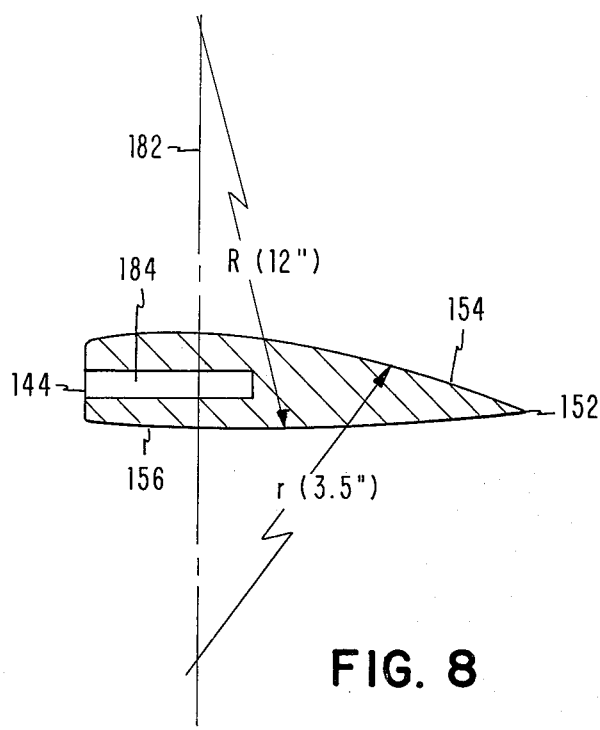
FIG. 8
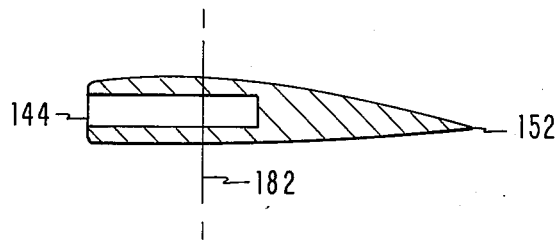
FIG. 9
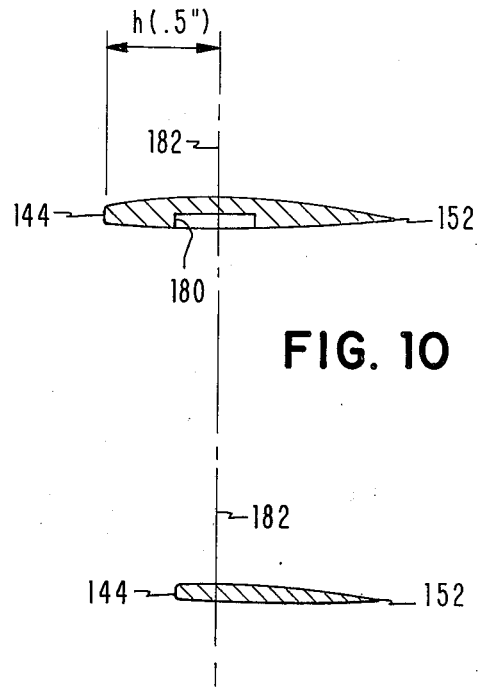
FIG. 10
FIG. 11
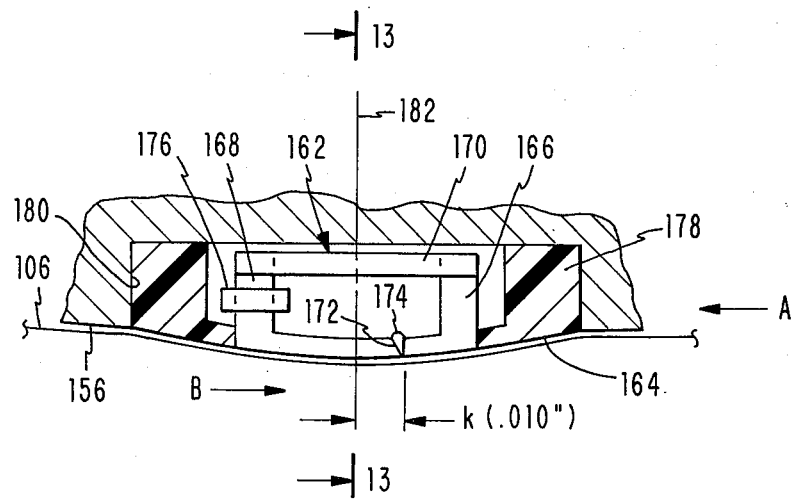
FIG. 12

STORAGE DEVICE UTILIZING FLEXIBLE MAGNETIC DISKS

BACKGROUND OF THE INVENTION

The invention relates to random access storage devices and more particularly to such devices utilizing flexible magnetic disks. Still more particularly, the invention relates to such storage devices utilizing magnetic disks in stacks.

It has previously been proposed to provide an access arm for carrying a magnetic transducer with the arm being tapered from its end so that the arm may move between adjacent disks in a stack of flexible disks. It has also previously been proposed to shape such an access arm so that it has a relatively sharp side edge and an opposite relatively blunt side edge, and the disks have been moved across the surfaces of such an arm from the blunt edge toward the sharp edge in an attempt to cause the disks to closely follow the outer surfaces of the arm and the transducer carried by the arm.

SUMMARY OF THE INVENTION

It is an object of the present invention to provide an improved shape of such an access arm to cause the flexible disks to even more closely follow the outer surfaces of the arm and in particular the transducer carried by such an arm.

In brief, the invention includes an access arm having a magnetic transducer embedded in it and slightly protruding from it for movement into a stack of flexible disks, with the arm having a relatively blunt side edge and a relatively sharp side edge and with the thickness of the arm increasing from the sharp edge to a position of maximum arm thickness adjacent the blunt edge at which the magnetic transducer is placed and mechanism for rotating the flexible disks so that they move from the sharp edge of the access arm toward the blunt edge of the access arm. I have found that with such a movement of the disks relative to the surfaces of the access arm, very close correspondence (with only slight air gaps) is obtained between the disks and the surfaces of the access arm and particularly the protruding surface of the magnetic transducer embedded in the arm for exceptionally good transferral of information to and from the disks with respect to the transducer.

BRIEF DESCRIPTION OF THE DRAWINGS

FIGS. 8, 9, 10 and 11 are sectional views taken on lines 8—8, 9—9, 10—10 and 11—11 of FIG. 6;

FIG. 12 is a sectional view taken on line 12—12 of FIG. 7; and

DESCRIPTION OF THE PREFERRED EMBODIMENT

Figure 1:
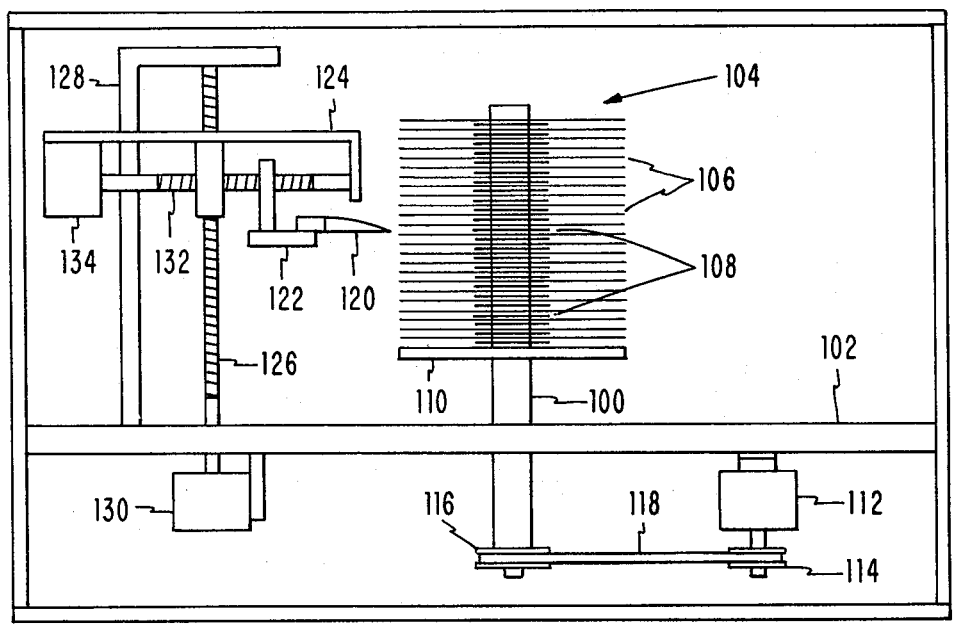
FIG. 1 is a side elevational view of an assembly including a vertical stack of rotatable disks, an access arm having a magnetic transducer embedded in it for moving between the disks, and power driven mechanism for moving the access arm vertically along the periphery of the disk stack and radially into the stack.

Referring now to FIG. 1 in particular, the random access magnetic recording device disclosed may be seen to comprise a spindle 100 which is rotatably disposed with respect to a frame 102. A stack 104 of individual magnetic disks 106 is mounted on the spindle 100. The disks 106 may be of flexible material, such as polyethylene terephthalate, and may be, for example, of 0.003 inch thickness. Spacing washers 108 are disposed between consecutive disks 106; and each washer may, for example, have a thickness of 0.007 inch. Each of the disks 106 has twelve openings 106a through it, and the openings 106a of the disks 106 in their stacked relationship are preferably in alignment. A relatively rigid plate 110 is preferably provided on the bottom of the disk stack 104, and the disks 106 may be fixed with respect to the spindle 100 by any suitable means. A motor 112 fixed to the frame 102 is provided for driving the spindle 100 and for thereby drivingly rotating the disks 106 and may be connected to the spindle 100 by means of a pair of pulleys 114 and 116 and a belt 118.

A magnetic access arm 120 is provided for entering between the disks 106. The access arm 120 is fixed with respect to a carriage 122 that in turn is reciprocably mounted within a carriage 124. The carriage 124 is moveable vertically as shown in FIG. 1 and has a lead screw 126 passing through it. The lead screw 126 is rotatably disposed in the frame 102 and within a standard 128 fixed to the frame 102. A motor 130 of the electrical stepping type fixed with respect to the frame 102 is connected to the lead screw 126 for the purpose of rotating the lead screw in one direction or the other for thereby moving the standard 124 either upwardly or downwardly. The carriage 122 is disposed on a lead screw 132 carried by the carriage 124, and a motor 134 of the electrical stepping type is fixed with respect to the carriage 124 for the purpose of drivingly rotating the screw 132 in one direction or the other for thereby moving the carriage 122 and the access arm 120 toward and away from the spindle 100.

Referring to FIGS. 6–11 in particular, it may be observed that the access arm 120 comprises a uniform thickness base portion 120a and a variable thickness working portion 120b. A shoulder 140 separates the portions 120a and 120b. The base portion 120a may be used for attaching the access arm 120 with respect to carriage 122, and the working portion 120b is that portion of the access arm 120 that moves between disks 106 in the stack 104. The base portion 120a is defined by edges 142, 144 and 146 that extend at right angles to each other. The working portion 120b is defined by the arm side edge 144 that is straight for most of the length of the arm 120 from its attachment end 120a, an edge 148 that extends at an acute angle with respect to the edge 144, a distal arm end or tip 150 and a curved arm side edge 152 that curves toward edge 144 so that the arm 120 narrows toward its tip 150. The upper surface 154 of the access arm 120 for its complete length is formed on a radius r as shown in FIG. 8, and this radius may, for example, be 3.5 inches. The lower surface 156 of the arm 120 is formed for its complete length on a larger radius R which may be 12 inches.

Figure 6:
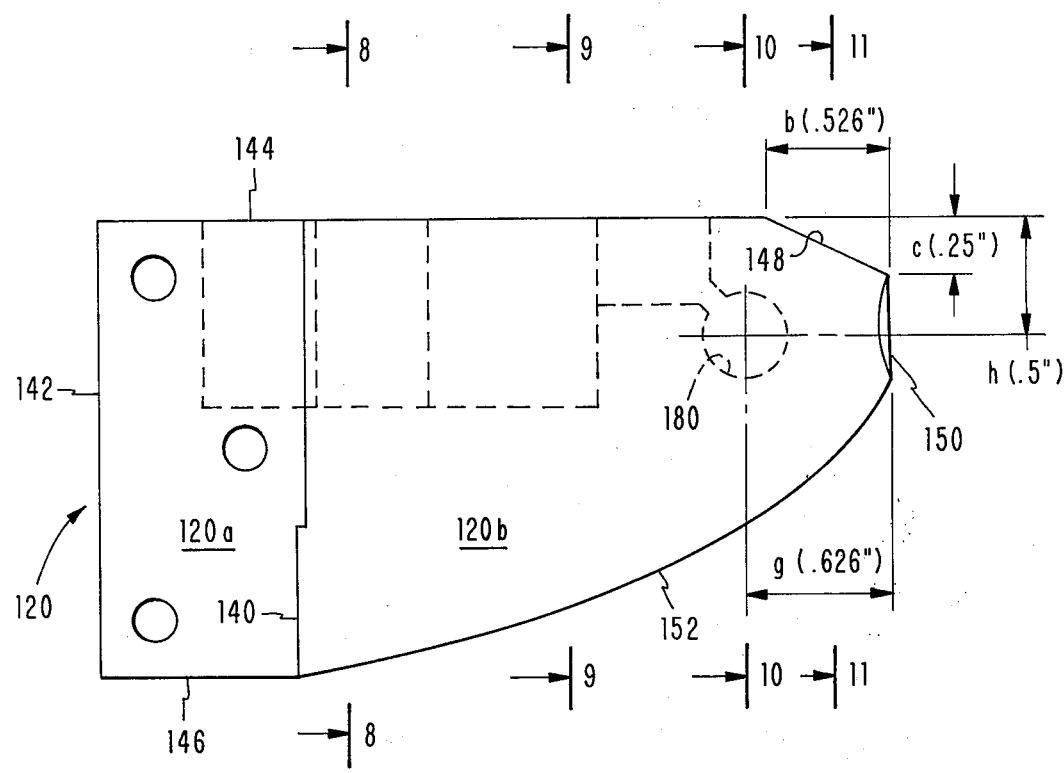
FIG. 6 is a plan view of the access arm (with the transducer removed from it for clearly illustrating the arm) and taken on a scale which is enlarged with respect to its scale as shown in FIG. 2.
Figure 7:
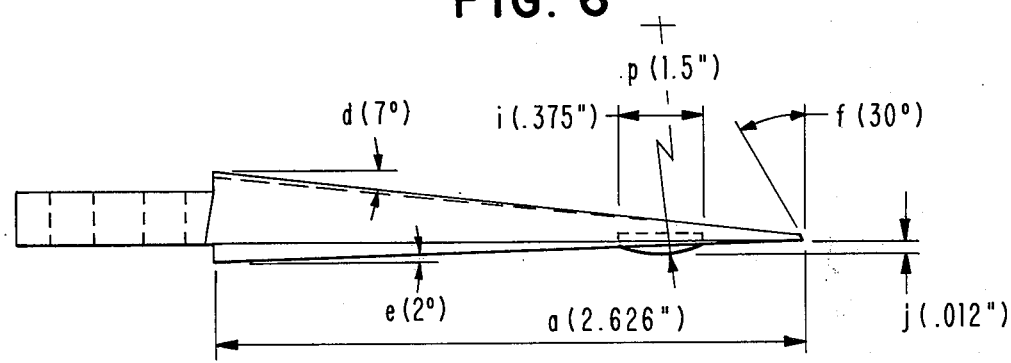
FIG. 7 is a side elevational view of the access arm with the transducer in place in the arm and taken on the same scale as its scale in FIG. 6.
Figure 13:
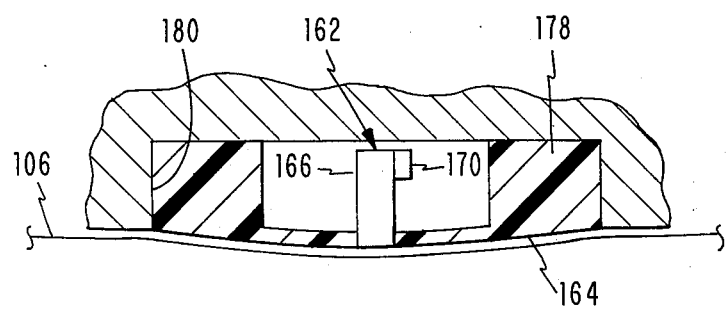
FIG. 13 is a sectional view taken on line 13—13 of FIG. 12.

The length of the working portion 120b of the access arm 20 may be 2.626 inches (dimension a in FIG. 7). The edge 148 is formed on a hypotenuse defined by the dimension b of 0.526 inch along the edge 144 and the dimension c of 0.25 inch perpendicular thereto as shown in FIG. 6. The upper surface 154 extends downwardly with respect to horizontal, assuming that the surfaces of the base portion 120a may be considered as extending horizontally; and the surface 154a may thus decline at 7 degrees (dimension d) as shown in FIG. 7. The lower surface 156 of the access arm 120 extends upwardly with respect to the surfaces of the base portion 120a, such as at an angle of 2 degrees (dimension e). The tip 150 preferably extends at an angle with respect to horizontal and with respect to vertical, such as at the angle of 30 degrees (dimension f) with respect to vertical shown in FIG. 7. The result of these dimensions is the access arm 120 as shown in FIGS. 6–11 having the upper and lower convex surfaces 154 and 156, the working portion 120b which tapers to a sharp point 150a at its tip 150, and a sharp edge 152 and a blunt relatively thick edge 144 viewing the access arm in cross section such as on the sections shown in FIGS. 8, 9, 10 and 11.

A magnetic transducer 162 is embedded in the access arm 120 adjacent to the tip 150. The center of the transducer 162 may be spaced from the tip 0.626 inch (dimension g, FIG. 6) and may be 0.5 inch (dimension h) from the edge 144. The transducer 162 may have a diameter of 0.375 inch (dimension i of FIG. 6); it may protrude from the lower curved surface 156 by 0.012 inch (dimension j); and its protruding surface 164 is spherical and may be formed on a radius $\rho$ of 1.5 inch. Thus, the lower surface 164 of the transducer 162 merges into the lower surface 156 as is shown quite well in both FIG. 7 and in FIG. 5.

It should be understood that the dimensions mentioned immediately above, including dimensions $\rho$, r, R, a, b, c, d, e, f, g, h, i and j are given for the purpose of example only and may well be varied within the purview of the invention.

The transducer 162 comprises two right angle-shaped ferrite core members 166 and 168 which are joined at their upper ends by a ferrite bridging member 170 (see FIG. 12). The core members 166 and 168 together form a "U", and the bridging member 170 in conjunction with the core members 166 and 168 form a complete closed magnetic circuit except for a gap 172. The gap 172 is provided between the core members 166 and 168 on the surface 164; and, as will be observed from FIG. 12, the gap 172 in cross section is in the form of an acute angle and is very narrow on the surface 164. A glasslike filler 174 is provided in the gap 172, and a winding 176 is provided on the core member 168. The core members 166 and 168 fit within a slot provided in a ceramic button 178 which in turn fits in a cylindrical cavity 180 formed in the access arm 120. The lower surface of the button 178 is formed on the radius $\rho$, as are the lower surfaces of the core members 166 and 168, and completes the spherical surface 164 protruding from the lower surface 156 of the access arm 120. The centers of the radii R, r and $\rho$ are all located on the center line 182 which passes through the center of the cavity 180 and of the transducer 162 and which is spaced at the distance h from the blunt side edge 144 of the arm 120. The transducer 162 is thus located at the maximum thickness portion of the arm 120 viewing the arm in cross section taken through the center of the transducer 162 (FIG. 10).

The access arm 120 is provided with a slot 184 extending inwardly from the blunt edge 144 of the access arm 120, and the slot 184 is connected with the cavity 180 so that leads from the coil 176 may be brought outwardly with respect to the access arm 120 for connection to any desired circuitry.

Figure 3:
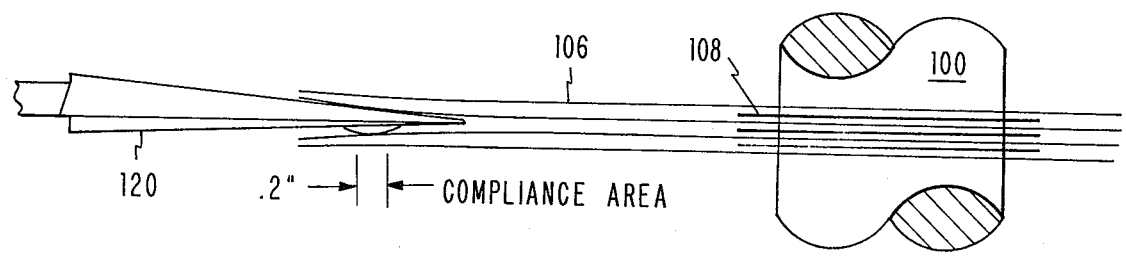
FIGS. 3 and 4 are side elevational views of the access arm positioned at different distances within the disk stack.
Figure 4:
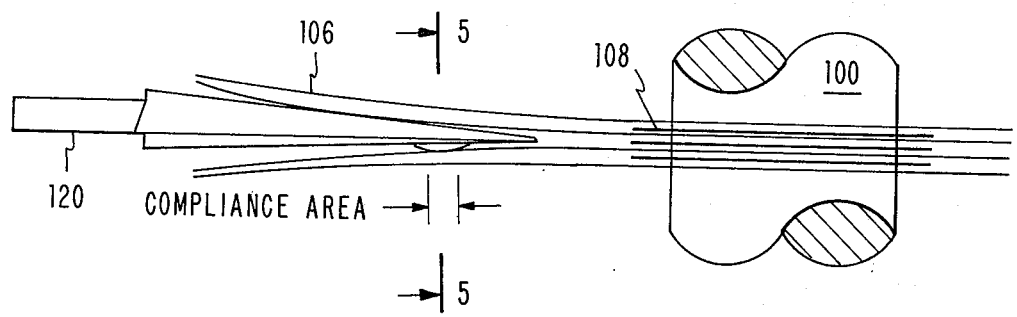

In operation, the carriage 122 and the access arm 120 are positioned vertically by action of the motor 130 so that the sharp outer or distal end 150 of the access arm 120 is in line with the space between the pair of disks 106 into which it is desired that the access arm 120 shall move. The stepper motor 134 is then energized so as to move the access arm 120 between this pair of disks 106. As the access arm 120 moves between this pair of disks, it separates the disks as shown in FIG. 3 and the compliance area of the surface 164 on the lower disk of the pair is 0.2 inch, for example, as shown in FIG. 3, if the full diameter of the transducer 162 is 0.375 inch, for example, as previously mentioned. The 0.2 inch diameter compliance area remains the same as the access arm 120 is moved farther inwardly into the gap as shown in FIG. 4, and this additional inward movement of the access arm 120 further separates the pair of disks between which the access arm 120 moves. The access arm 120 is moved sufficiently inwardly of the disk stack 104 so that the gap 172 on the surface 164 of the transducer 162 lies in registry with the desired concentric magnetic track on the lower disk of the pair of disks between which the access arm 120 has been moved.

Figure 2:
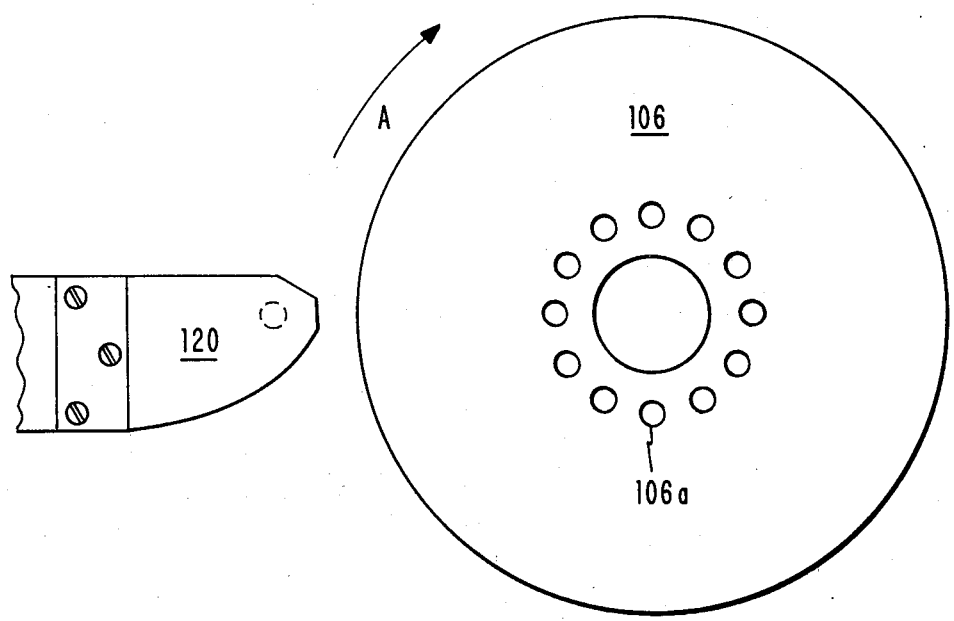
FIG. 2 is a plan view of one of the magnetic disks and of the access arm as the access arm is about to move into the stack of disks.
Figure 5:
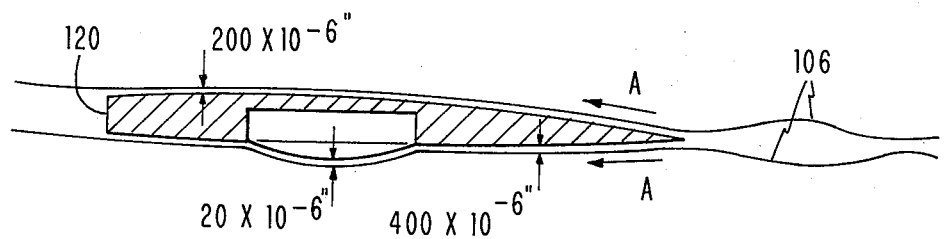
FIG. 5 is a sectional view taken on line 5—5 of FIG. 3.

The rotation of the disks 106 is in the direction A as shown in FIGS. 2, 5 and 12; and the sharp edge 152 of the access arm 120 thus constitutes the leading edge of the access arm 120 with respect to the disks 106, while the relatively thick blunt edge 144 of the access arm 120 constitutes the trailing edge of the arm 120. I have found that, with the disks 106 moving in the direction A over the surfaces 154 and 156 of the access arm 120, the flexible disks 106 conform very closely to the cylindrical surfaces 154 and 156 of the access arm 120 and to the spherical surface 164 of the transducer 162. The shape of the access arm 120 provides an air bearing with respect to the disks 106 both above and below the arm 120; however, the spacing is very close. The spacing between the upper surface 154 of the access arm 120 and the disk 106 above the arm 120 is on the order of $200 \times 10^{-6}$ inches, and the spacing between the lower surface 156 of the access arm 120 and the adjacent disk 106 is on the order of $400 \times 10^{-6}$ inches, as shown in FIG. 5. The spherical surface 164 of the transducer 162 is spaced even closer to that disk 106 below the surface 156 so that a good magnetic transducing action is had between the transducer 162 and this disk 106, and the spacing between the transducer surface 164 and the upper surface of the disk 106 just below the access arm 120 is on the order of $20 \times 10^{-6}$ inch. For obtaining an especially close compliance of the transducer 162 at the gap 172 with the disk 106 below the transducer, the gap 172 is located off-center with respect to the center line 182 by a dimension k which may be 0.010 inch, for example (see FIG. 12). The gap 172 is offset from the center line 182 in the direction B seen in FIG. 12 which is exactly opposite to the direction A of movement of the disks 106 as shown in FIG. 12 for this effect.

I consider that the close compliance of the disks 106 just above and just below the arm 120 with the arm surfaces 154 and 156 is obtained due to the shaping of the arm 120 much like an airplane wing in cross section, with the sharp edge 152 and the opposite blunt edge 144, due to the direction of travel of the disks 106 in the direction A, from the sharp edge 152 toward the blunt edge 144, and due to the surfaces 154 and 156 being cylindrical, formed on the radii r and R. I consider that the even closer compliance of the disk 106 below the surface 156 with the surface 164 of the transducer 162 particularly at its gap 172 is due to the surface 164 being spherical, due to the location of the transducer 162 at a place of maximum thickness of the arm 120 in cross section (as seen in FIGS. 5 and 10) and closer to the blunt edge 144 than to the sharp edge 152, due to the fact that the surface 164 merges into the surface 156 and protrudes slightly from the surface 156 and due to the offsetting of the gap 172 from the center of the transducer 162 in direction B opposite to the direction A of disk movement. The compliance of the lower disk 106 with the surface 164 remains the same as the arm 120 is moved farther inwardly between a pair of the disks 106, and the area of compliance of the lower disk 106 is particularly at the gap 172 so that good reading and writing action is obtained with respect to the lower disk 106 below the surface 156. This formation of the arm 120, with the surfaces 154 and 156 being cylindrical and the transducer surface 164 being spherical, also assures that air films are generated between the arm 120 and transducer 162 and the disks 106 just above and just below the arm 120, in order to provide minimum wear on the disks.

The sharp edge 150a on the tip 150 assures that the arm 120 may be moved exactly between the desired pair of disks 106, and the decreasing thickness of the arm 120 from the shoulder 140 toward the tip 150 insures stability of the disk stack 104 as the arm 120 is moved into the stack. This is also assured, since the arm 120 is considerably narrower at its tip than at its base adjacent the shoulder 140, commensurate with the decreasing thickness of the arm 120 toward the tip 150. In addition, this configuration of the arm 120, particularly with the disks 106 moving in the direction A over the surfaces 154 and 156 from the sharp edge 152 to the blunt edge 144, provides a construction that can tolerate substantial disk stack rotational speed variations. The speed of the spindle 100 and of the disks 106 can well vary, while obtaining the close compliance between the transducer surface 164 and the disk 106 below the arm 120, and results that are very satisfactory in this respect have been obtained with spindle speeds between 1600 rpm and 2000 rpm, with the tracks on the disk 106 described by the transducer 162 being between 4.3 and 7.0 inches in diameter.

I claim as my invention:

1. A magnetic storage device comprising a spindle; a stack of spaced magnetic flexible disks disposed on and fixed with respect to said spindle; an access arm; said arm having an attachment base portion and a distal end and in cross section having a sharp side edge and a blunt side edge and first and second opposite curved disk complying surfaces connecting said edges; means for moving said arm along the periphery of the stack of disks to a selected location opposite a space between a pair of the disks; means for moving said arm between said pair of disks to have said curved surfaces lying along the surfaces of said pair of disks; a transducer carried by and embedded in said arm adjacent said distal end and between said blunt and sharp edges and having a portion with a rounded outer surface protruding from one of said curved disk complying arm surfaces; and means for drivingly rotating said spindle and thereby said disks in such direction so that, with said arm lying between said pair of disks, the disks move across said curved surfaces of said arm from said sharp edge to said blunt edge for securing close compliance of one of said pair of disks with said transducer.

2. A magnetic storage device as set forth in claim 1 in which said second curved disk complying surface has a larger radius than that of said first curved disk complying surface and in which said rounded outer surface of said transducer protrudes from said second, larger radius, curved disk complying surface.

3. A magnetic storage device as set forth in claim 2, said blunt edge for a major portion of its length being substantially straight and said sharp edge for a major portion of its length being curved and extending toward said blunt edge so as to decrease the width of said arm toward its said distal end.

4. A magnetic storage device as set forth in claim 2, said access arm decreasing in width between said blunt and sharp edges toward said distal end and decreasing in thickness toward said distal end.

5. A magnetic storage device as set forth in claim 2, said curved disk complying arm surfaces being cylindrical and said transducer rounded surface being spherical, the centers of said curved disk complying arm surfaces and the center of said spherical transducer surface being on the same longitudinal center line extending through the center of said transducer.

* * * * *